US006835768B2

(12) United States Patent
Agur et al.

(10) Patent No.: US 6,835,768 B2
(45) Date of Patent: Dec. 28, 2004

(54) WAX DISPERSIONS AND PROCESS THEREOF

(75) Inventors: Enno E. Agur, Toronto (CA); Guerino G. Sacripante, Oakville (CA); Fatima M. Mayer, Mississauga (CA)

(73) Assignee: Xerox Corporation, Stamford, CT (US)

( * ) Notice: Subject to any disclaimer, the term of this patent is extended or adjusted under 35 U.S.C. 154(b) by 203 days.

(21) Appl. No.: 10/230,608

(22) Filed: Aug. 28, 2002

(65) Prior Publication Data

US 2004/0044108 A1 Mar. 4, 2004

(51) Int. Cl.⁷ .............................. C08K 5/01; C08L 91/08
(52) U.S. Cl. ...................... 524/487; 524/488; 430/137
(58) Field of Search .......................... 430/137; 524/487, 524/488

(56) References Cited

U.S. PATENT DOCUMENTS

| 4,557,991 | A | 12/1985 | Takagiwa et al. ........... 430/109 |
|---|---|---|---|
| 4,770,969 | A | 9/1988 | Shirose et al. .............. 430/109 |
| 5,290,654 | A | 3/1994 | Sacripante et al. ......... 430/137 |
| 5,348,832 | A | 9/1994 | Sacripante et al. ......... 430/109 |
| 5,593,807 | A | 1/1997 | Sacripante et al. ......... 430/137 |
| 5,723,137 | A | 3/1998 | Wahle et al. ............... 424/401 |
| 5,746,812 | A | 5/1998 | Muller et al. ................ 106/10 |
| 5,840,462 | A | 11/1998 | Foucher et al. ............. 430/137 |
| 5,853,944 | A | 12/1998 | Foucher et al. ............. 430/137 |
| 5,858,601 | A | 1/1999 | Ong et al. ................... 435/137 |
| 5,863,698 | A | 1/1999 | Patel et al. .................. 430/137 |
| 5,902,710 | A | 5/1999 | Ong et al. ................... 430/110 |
| 5,916,725 | A | 6/1999 | Patel et al. .................. 430/137 |
| 5,919,595 | A | 7/1999 | Mychajlowskij et al. ... 430/137 |
| 5,925,488 | A | 7/1999 | Patel et al. .................. 430/137 |
| 5,977,210 | A | 11/1999 | Patel et al. .................. 523/161 |
| 6,042,978 | A | 3/2000 | Soeda et al. ................... 430/45 |
| 6,287,740 | B2 | 9/2001 | Ohmura et al. ........... 430/108.8 |
| 6,458,499 | B1 * | 10/2002 | Onuma et al. ........... 430/108.4 |

* cited by examiner

*Primary Examiner*—Kriellion A. Sanders
(74) *Attorney, Agent, or Firm*—E. O. Palazzo

(57) ABSTRACT

A dispersion comprised of a wax and a hydrophilic polyester stabilizer.

31 Claims, No Drawings

WAX DISPERSIONS AND PROCESS THEREOF

The present invention is generally directed to aqueous wax dispersions and processes thereof, and which dispersions are comprised, for example, of wax particles stabilized with a hydrophilic polyester resin, and wherein the dispersions are useful for a variety of applications, such as ingredients for toners, inks, paints, or coating formulations such as a coating for articles like wood. More specifically, the present invention relates to storage/stable wax dispersions, and economical and practical methods for generating a storage/stable wax dispersion stabilized by a hydrophilic polyester resin, and wherein the wax particles have a fine particle size range, such as, for example, a particle size of from about 10 to about 500 nanometers, with particle size distribution, such as, for example, about 1.2 to about 1.6, as measured utilizing a Microtrac UPA150 particle size analyzer, or a Nicomp Analyzer. Yet, more specifically, the present invention relates to economical processes compared, for example, to solvent based or dispersion based methods for generating wax dispersions wherein the wax dispersion is obtained by utilizing a known apparatus comprised of a homogenizer connected to a reactor in a sealed and closed loop configuration; and wherein the process is comprised of homogenizing the wax in an aqueous solution containing a stabilizer, such as a hydrophilic polyester resin, and wherein the defined particle size is attained, for example, by controlling the concentration of wax, the concentration of the stabilizer, and apparatus and process variables such as temperature, pressure and time. The wax dispersion in embodiments is storage/stable, that is stable without agglomeration or settling for a substantial time, such as more than six months, and more specifically, for more than two years.

In specific embodiments, the present invention is directed to the economical preparation of a storage/stable wax dispersion stabilized with a hydrophilic polyester resin, such as a wax, selected from the group comprised of natural waxes, such a carnauba wax, paraffin wax, montan wax; synthetic waxes, such as microcrystalline polyethylene wax, polybutylene wax, polyethylene-acrylic wax, polyester wax, polyamide wax, or Fischer-Tropsch wax, mixtures thereof and the like; and wherein the wax dispersion possesses, for example, a particle size diameter of from about 10 to about 500 nanometers with a size distribution of from about 1.2 to about 1.6. The wax dispersion is preferably obtained by utilizing a known apparatus comprised of a homogenizer, such as a Gaulin 15MR available from APV Homogenizer, connected to a reactor in a sealed and closed loop configuration, such as a one gallon stainless steel jacketed reactor with steam heating and water cooling capability; heating to a temperature higher than the peak melting point of the wax to melt the wax, such as from about 10° C. or more higher than the peak melting point of the wax, and thereafter the mixture resulting is pumped through the homogenizer, which is comprised of two valves in series comprised of a primary valve that operates at high pressure, such as up to 8,000 pounds per square inch (psi), during homogenization, and a secondary valve that operates at lower pressures of up to about 1,000 pounds per square inch (psi); and wherein the homogenizer (generating emulsions or dispersions in a fluid mixture under pressure) is initially operated in a pre-emulsification mode where the primary valve is fully open and the secondary valve is partially closed to generate a pressure drop of about 800 to about 1,000 psi for a desired period of time, up to 8 theoretical passes (time for one theoretical pass is calculated by the mixture volume divided by the volumetric flow rate through the homogenizer). More specifically, for a 4 liter mixture pumped at 1 liter per minute, one theoretical pass consumes about 4 minutes; 30 minutes of pre-emulsification is equivalent to about 7.5 theoretical passes. After pre-emulsification, the primary valve is partially closed to increase the homogenizer pressure to a desired pressure of from about 3,000 psi to about 8,000 psi. Emulsification is accomplished for a number of theoretical passes of from about 5 to about 15 passes, and wherein operating at a higher pressure for a longer time period results in a smaller wax particle size in the product. After completion of emulsification, the homogenizer is disconnected and the wax dispersion in the reactor is cooled to ambient room temperature, discharged into a product container and filtered through a filter bag (typically about 1 to about 50 micron pore size). The dispersion product is analyzed for total solids content using a Sartorius MA30 moisture analyzer and average particle size and particle size distribution using the Microtrac UPA150 particle.

Aqueous wax dispersions based on polyethylene or polypropylene waxes can be prepared in principle by two methods; as primary dispersions by polymerization of ethylene or propylene in a surfactant-containing aqueous phase under super atmospheric pressure and in the presence of an initiator system, or as secondary dispersions by dispersing dispersible polyethylene or polypropylene waxes in powder form with the aid of a suitable dispersant system. Emulsifiable waxes usually contain low molecular weight polyolefin chains functionalized with carboxylate, keto or hydroxyl groups; the chains can be prepared by copolymerization of ethylene or propylene with, for example, unsaturated carboxylic acids, such as acrylic acid, or by atmospheric oxidation of polyolefin waxes. Primary dispersions generally possess particle sizes of from about 10 to about 1,000 nanometers. Dispersions having larger particles tend to undergo phase separation primarily in view of the low density and the hydrophobic nature of the polyolefin wax. In both preparation methods, solids contents of up to about 35 percent by weight can usually be achieved. Higher wax contents are achievable in relatively high amounts with difficulties.

In U.S. Pat. No. 5,723,137, the disclosure of which is totally incorporated herein by reference, there is illustrated a process for producing a storage/stable wax dispersion by, for example, heating a mixture containing (A) about 10 percent to about 80 percent by weight of a wax, (B) about 0.5 percent to about 30 percent by weight of a hydrophilic nonionic dispersant having an HLB value of about 8 to about 18, and (C) about 1 percent to about 30 percent by weight of a hydrophobic codispersant selected from the group consisting of fatty alcohols containing about 12 to about 22 carbon atoms and partial esters of polyols containing about 3 to about 6 carbon atoms with fatty acids containing about 12 to about 22 carbon atoms, and wherein the weight ratio of component (B) to component (C) is from about 0.5:1 to about 20:1, and which process is completed in the presence of about 15 percent to about 85 percent by weight of water; heating to a temperature above the melting point of the mixture of components (A) to (C) to form a dispersion; heating the dispersion to its phase inversion temperature, and then cooling the dispersion to a temperature below its phase inversion temperature.

In U.S. Pat. No. 5,746,812, the disclosure of which is totally incorporated herein by reference, there are illustrated aqueous polyolefin wax dispersions that contain (A) from about 5 to about 65 percent by weight of polyethylene wax or polypropylene wax having a mean particle size of from about 1 to about 50 and an acid number of less than about 5 milligrams of KOH/gram of wax, and (B) from about 0.5 to about 20 percent by weight of glyceride of predominantly ethylenically monounsaturated or polyunsaturated monocarboxylic acids which may additionally contain hydroxyl groups, which glyceride has been reacted with from about 1 to about 50 mol of a 1,2-alkylene oxide of about 2 to about 4 carbon atoms as a dispersant.

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby form toner composites.

Disadvantages associated with the prior art processes for generating wax dispersions are that surfactants are normally employed, which results in the presence of unwanted surfactants that need to be removed during downstream toner operations. Thus, with the use of the present invention wax dispersions, the removal of surfactants after toner preparation is avoided thereby providing economical toner methods.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832; 5,405,728; 5,366,841; 5,496, 676; 5,527,658; 5,585,215; 5,650,255; 5,650,256; 5,501, 935; 5,723,253; 5,744,520; 5,763,133; 5,766,818; 5,747, 215; 5,827,633; 5,853,944; 5,804,349; 5,840,462; 5,869, 215; 5,910,387; 5,919,595; 5,916,725; 5,902,710; 5,863, 698, 5,925,488; 5,977,210 and 5,858,601. The appropriate components and processes of these Xerox Corporation patents may be selected for the present invention in embodiments thereof.

SUMMARY

It is a feature of the present invention to provide wax dispersions and processes thereof.

In another feature of the present invention there are provided simple and economical chemical processes for the preparation of a wax dispersion.

In a further feature of the present invention there is provided a wax dispersion stabilized by a hydrophilic polyester resin.

Also, in another feature of the present invention there is provided a wax dispersion stabilized by a hydrophilic polyester resin, and wherein the wax particles possess, for example, a fine size, such as for example, from about 10 to about 500 nanometers, and more specifically, from about 100 to about 300 nanometers, and with a particle size distribution, such as, for example, about 1.2 to about 1.6 as measured utilizing a Microtrac UPA150 particle size analyzer, or a Nicomp Analyzer.

Moreover, in another feature of the present invention there are provided economical and practical methods for generating a storage/stable wax dispersion.

In yet another feature of the present invention there is provided a process for the preparation of a wax dispersion stabilized with a hydrophilic polyester resin with a wax particle size diameter of from about 10 to about 400 nanometers, and preferably from about 100 to about 250 nanometers.

In yet another feature of the present invention there is provided a process for the preparation of a storage/stable wax dispersion, wherein the dispersion is stable without agglomeration or sedimentation for a period of more than 6 months, and generally about 2 years.

Moreover, in another feature of the present invention there is provided a process for generating wax dispersions stabilized with a hydrophilic polyester resin utilizing a homogenizer, such as a Gaulin Homogenizer, connected to a reactor in a sealed and closed loop configuration, such as a one gallon stainless steel jacketed reactor with steam heating and water cooling capability, and wherein the particle size of the dispersion can be controlled by process variables such as pressure, temperature, and time.

Aspects of the present invention relate to an aqueous dispersion comprised of a wax and a hydrophilic polyester stabilizer; a dispersion wherein the hydrophilic polyester is of the formula

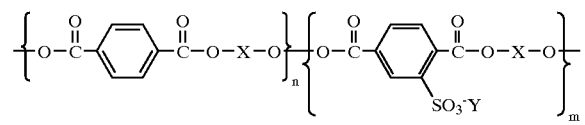

wherein Y is, for example, selected from the group consisting of hydrogen and an alkali metal, X is, for example, selected from the group consisting of an alkylene and an oxyalkylene group, and n and m represent the number of segments; a dispersion wherein the sum of n and m are from about 100 to about 10,000, and wherein n is from about 90 to about 97.5 percent of the total amount of polyester segments, and wherein m is about 2.5 to about 10 percent of the total amount of polyester segments, and wherein the total of n plus m is equal to about 100 percent; a dispersion wherein the wax is selected from the group consisting of natural waxes, chemically modified waxes and synthetic waxes; a dispersion wherein the wax is carnauba wax, paraffin wax, montan wax, microcrystalline polyethylene wax, polypropylene wax, polybutylene wax, polyethylene-acrylic wax, polyester wax, polyamide wax, or a Fischer-Tropsch wax; a dispersion wherein the alkylene is a hydrocarbon of about 2 to about 36 carbon atoms; a dispersion wherein the Y alkali is selected from the group consisting of sodium, lithium, potassium, rubidium, and cesium; a dispersion wherein the volume median diameter of the wax dispersion is from about 10 to about 500 nanometers; a dispersion wherein the volume median diameter of the wax dispersion is from about 20 to about 400 nanometers; a dispersion wherein the hydrophilic polyester is copoly(1,2-propylene-dipropylene-5-sulfoisophthalate)-copoly(1,2-propylene-dipropylene terephthalate), the magnesium salt of copoly(1,2-propylene-diethylene-5-sulfoisophthalate)-copoly(1,2-propylene-diethylene terephthalate), the calcium salt of copoly(1,2-propylene-dipropylene-5-sulfoisophthalate)-copoly(1,2-propylene-dipropylene terephthalate), or the barium salt of copoly(1,2-propylene-diethylene-5-sulfoisophthalate)-copoly(1,2-propylene-diethylene terephthalate); a dispersion wherein the wax content is from about 20 to about 35 percent by weight of the dispersion, the hydrophilic polyester resin content is from about 0.1 to about 5 percent by weight of the dispersion, and the remainder is water, and wherein the total of the components is about 100 percent; a dispersion wherein the hydrophilic polyester weight average molecular weight as measured by gel permeation chromatography is from about 2,000 grams per mole to about 100,000 grams per mole; the number average molecular weight as measured by gel permeation chromatography is from about 1,000 grams per mole to about 50,000 grams per mole, and the polydispersity thereof is from about 2 to about 18, from about 2 to about 7; a dispersion wherein the polyester weight average molecular weight is from about 4,000 to about 70,000 grams per mole, and the number average molecular weight is from about 2,000 to about 20,000 grams per mole; a process for the preparation of a wax dispersion which comprises homogenizing the wax with a hydrophilic polyester stabilizer in water; a process wherein homogenizing is accomplished at about 1,000 pounds per square inch to about 8,000 pounds per square inch for an optional duration of about 30 to about 90 minutes, and at a temperature of about 10° C. to about 25° C. above the melting point of the wax, and wherein the wax has a melting point of about 50° C. to about 120° C.; a wherein the wax dispersion possesses a particle size diameter of about 5 to about 500 nanometers; a process wherein the wax content is about 20 to about 35 percent by weight of the dispersion, the hydrophilic polyester resin content is from about 0.1 to about 5 percent by weight of the dispersion with the remainder of about 60 to about 65 percent by weight being water; a process wherein the wax is carnauba wax, paraffin wax, montan wax, microcrystalline polyethylene wax, polypropylene wax, polybutylene wax, polyethylene-acrylic wax, polyester wax, polyamide wax, or Fischer-Tropsch wax; a dispersion wherein the wax is ethylene, propylene, butylene, pentylene, hexylene, heptylene, octylene, decylene, dodecylene, stearylene, octadecylene, 2-ethyl-octadecylene, and mixtures thereof; a process wherein the hydrophilic polyester resin is of the formula

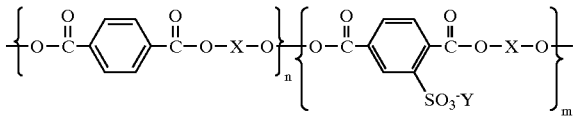

wherein Y is hydrogen or an alkali metal, X is an alkylene or oxyalkylene group, and n and m represent the number of segments; a process wherein Y is sodium and X is alkylene; a process wherein Y is sodium and X is 1,2-propylene; a process wherein X is alkylene; a process wherein Y is alkali metal; a dispersion wherein the wax content is from about 20 to about 35 percent by weight of the dispersion, the hydrophilic polyester resin content is from about 0.1 to about 5 percent by weight of the dispersion and the remainder of about 60 to about 65 weight percent is water; a dispersion wherein the wax remains dispersed, and wherein there is minimum or no settling of the wax; a dispersion wherein the oxyalkylene is a hydrocarbon selected from the group comprising of ethyleneoxyethylene, propyleneoxy-propylene, butyleneoxybutylene, isopropyleneoxy-isopropylene, and isobutyleneoxy-isobutylene; a dispersion wherein Y is an alkali metal; a dispersion wherein Y is sodium; a dispersion wherein X is an alkylene; a dispersion wherein Y is sodium and X is 1,2-propylene; a dispersion wherein the polyester is the sulfonated polyester resin sodio salt of (1,2-propylene-dipropylene-5-sulfoisophthalate)-copoly (1,2-propylene-dipropylene terephthalate); a toner process which comprises heating a wax dispersion containing a sulfonated polyester with a colorant dispersion, which heating is in sequence below the polyester resin glass transition temperature, and then above the polyester resin glass transition temperature; and a dispersion comprised of a wax and a stabilizer of an anionic surfactant, a cationic surfactant, or a nonionic surfactant.

An example of a hydrophilic polyester resin that functions to primarily stabilize the wax to substantially prevent the wax from aggregating, agglomerating, or settling is a sulfonated polyester resin as illustrated in, for example, U.S. Pat. Nos. 5,348,832; 5,853,944; 5,840,462; 5,660,965; 5,658,704; 5,648,193 and 5,593,807; the disclosures of each patent being totally incorporated herein by reference, and for example, wherein the polyester is of the formula

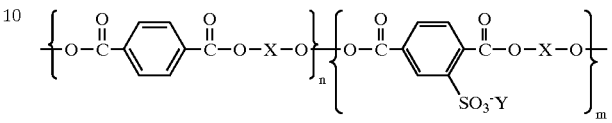

wherein Y is hydrogen or an alkali metal, such as sodium, lithium, potassium rubidium, cesium, and the like; X is an alkylene or oxyalkylene, such as an aliphatic hydrocarbon with, for example, from about 2 to about 12 carbons, such as ethylene, propylene, butylene, pentylene, hexylene, heptylene, octylene, decylene, dodecylene, 2-methylethylene, ethyleneoxyethylene, 2-ethyleneoxy-2'-ethylene, and the like, or mixtures thereof; and n and m represent the number of segments, and wherein n is, for example, a number of about 3 to about 25 percent of the total of n and m, and more specifically, n is from about 4 to about 15 percent of the total of n and m; and wherein the total of m and n is from about 100 to about 10,000; wherein the weight average molecular weight of the polyester is, for example, from about 2,000 grams per mole to about 100,000 grams per mole, and more specifically, from about 4,000 to about 70,000 grams per mole; the number average molecular weight is, for example, from about 1,000 grams per mole to about 50,000 grams per mole, and more specifically, from about 2,000 to about 20,000 grams per mole, and the polydispersity thereof is, for example, from about 2 to about 18, and more specifically, from about 2 to about 7, as measured by gel permeation chromatography. The resin is then heated in water to a temperature of, for example, from about 75° C. to about 95° C. with stirring to form an aqueous emulsion of the sulfonated polyester resin of a diameter of from about 10 to about 100 nanometers, and with a solids content containing, for example, from about 5 to about 35 percent by weight of water, and more specifically, from about 12 to about 20 percent by weight of water. Subsequent to cooling, the wax dispersion can be selected for the preparation of toners by, for example, the emulsion aggregation processes illustrated herein.

Hydrophilic polyester examples are the sodio salt of copoly(1,2-propylene-dipropylene-5-sulfoisophthalate)-copoly(1,2-propylene-dipropylene terephthalate), the lithio salt of copoly(1,2-propylene-diethylene-5-sulfoisophthalate)-copoly(1,2-propylene-diethylene terephthalate), the potassio salt of copoly(1,2-dipropylene-5-sulfoisophthalate)-copoly(1,2-propylene terephthalate), the hydrogen ion of copoly(1,3-butylene-5-sulfoisophthalate)-copoly(1,3-butylene terephthalate), the cesium salt of copoly(1,2 dipropylene-5-sulfoisophthalate)-copoly(1,2-propylene terephthalate), the sodio salt of copoly (1,3-butylene-5-sulfoisophthalate)-copoly(1,3-butylene terephthalate), the lithio salt of copoly(1,2-propylene-diethylene-5-sulfoisophthalate)-copoly(1,2-propylene-diethylene terephthalate), the nickel salt of copoly(1,2 dipropylene-5-sulfoisophthalate)-copoly(1,2-propylene terephthalate), the potassio salt of copoly(1,3-butylene-5-sulfoisophthalate)-copoly(1,3-butylene terephthalate), the sodio salt of copoly(1,2 dipropylene-5-sulfoisophthalate)- copoly(1,2-propylene terephthalate), the lithio salt of copoly (1,3-butylene-5-sulfoisophthalate)-copoly(1,3-butylene terephthalate), and the like. The polyester is present in the dispersion in an effective amount of, for example, from about 1 to about 15 percent by weight of the dispersion, and preferably from about 1 to about 5 percent by weight of the dispersion.

Waxes are present in the dispersion in an effective amount of, for example, from about 15 to about 35, and preferably from about 20 to about 35 percent by weight of the dispersion, and which waxes include both natural or synthetic waxes. Examples of natural waxes are, for example, selected from the group consisting of carnauba wax, paraffin wax, montan wax, microcrystalline wax, and the like. Examples of waxes include polyethylene waxes, polybutylene waxes, polyethylene-acrylic waxes, polyester waxes, polyamide waxes, or Fischer-Tropsch waxes, which are available from Michelman Performance Additives or Petrolite; natural waxes, such as carnauba waxes, vegetable waxes derived from Brazilian palm trees (*Copemica cerifera*), which is a relatively hard, brittle wax whose main attributes are lubricity, anti-blocking and FDA compliance with a melting point range of from about 83° C. to about 86° C.; low-molecular weight paraffin waxes with melting points of from about 48° C. to about 74° C.; montan, a mineral wax which, in its crude form, is extracted from lignite formed by the decomposition of vegetable substances with a melting point of from about 79° C. to about 89° C.; and microcrystalline waxes obtained from the distillation of crude oil which have molecular weights of from about 500 to about 675 grams/mole and melting points of from about 73° C. to about 94° C. the synthetic waxes, such as Fischer-Tropsch waxes, obtained from South Africa, have molecular weights $M_w$ of from about 300 to about 1,400 grams/mole, and melting points of about 99° C., and provide block, rub and scuff resistance; and polyethylene (PE) waxes obtained from ethylene produced from natural gas or by cracking petroleum naphtha. Ethylene is then polymerized to produce waxes with various melting points, hardnesses and densities. Polyethylene molecular weights $M_w$ range, for example, from about 500 to about 3,000 grams/mole. Low-density polyethylenes (LDPE) display excellent toughness and exhibit very acceptable crystal formations. Densities are from about 0.90 to about 0.94 gram/milliliter, and melt points are from about 30° C. to about 141° C. LDPEs are used to improve mar and abrasion resistance, lubricity, slip and anti-blocking; and ethylene-acrylic acid (EAA) dispersions.

The waxes, in general, display melting points of, for example, from about 40° C. to about 110° C., and more specifically, from about 60° C. to about 95° C. Specific examples of waxes that may be selected are illustrated in U.S. Pat. Nos. 4,557,991; 4,770,969; 4,877,704; 4,917,982; 4,921,771; 4,931,375; 4,997,739; 4,988,598; 5,004,666; 5,023,158; 5,629,188; 5,738,964; 6,042,978 and 6,287,740.

The following Examples are being submitted; these Examples are intended to be illustrative only and are not intended to limit the scope of the present invention. Also, parts and percentages are by weight unless otherwise indicated. Preparation of toners utilizing the wax dispersions generated can be formulated as illustrated, for example, in copending application U.S. Ser. No. 10/175,246 entitled Toner Process, the disclosure of which is totally incorporated herein by reference.

EXAMPLE I

Preparation of a Hydrophilic Polyester Resin Stabilizer

A linear sulfonated random copolyester resin comprised of, on a mol percent, 0.465 of terephthalate, 0.035 of sodium sulfoisophthalate, 0.475 of 1,2-propanediol, and 0.025 of diethylene glycol was prepared as follows. In a 5 gallon Parr reactor equipped with a bottom drain valve, double turbine agitator, and distillation receiver with a cold water condenser were charged 3.98 kilograms of dimethylterephthalate, 451 grams of sodium dimethyl sulfoisophthalate, 3.104 kilograms of 1,2-propanediol (1 mole excess of glycol), 351 grams of diethylene glycol (1 mole excess of glycol), and 8 grams of butyltin hydroxide oxide catalyst. The reactor was then heated to 165° C. with stirring for 3 hours whereby 1.33 kilograms of distillate were collected in the distillation receiver, and which distillate was comprised of about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with the collection of approximately 470 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 530 grams of 1,2-propanediol were collected. The reactor was then purged with nitrogen to atmospheric pressure, and the polymer product discharged through the bottom drain onto a container cooled with dry ice to yield 5.60 kilograms of 3.5 mol percent of the sulfonated polyester resin sodio salt of (1,2-propylene-dipropylene-5-sulfoisophthalate)-copoly(1,2-propylene-dipropylene terephthalate). The sulfonated polyester resin glass transition temperature was measured to be 56.6° C. (onset) utilizing the 910 Differential Scanning Calorimeter available from E.I. DuPont operating at a heating rate of 10° C. per minute. For the polyester product, the number average molecular weight was measured to be 3,250 grams per mole, and the weight average molecular weight was measured to be 5,290 grams per mole using tetrahydrofuran as the solvent.

Preparation of a Sodio Sulfonated Polyester Dispersion Solution

A 12 percent of dispersion of the above prepared sulfonated polyester resin was generated by first heating about 2 liters of water to about 85° C. with stirring, and adding thereto about 240 grams of the sulfonated polyester resin obtained, followed by continued heating for about 60 minutes at about 85° C., and stirring of the mixture for a duration of from about one to about two hours, followed by cooling to about room temperature, about 25° C. throughout the Examples. The resulting dispersion had a characteristic blue tinge and a particle size diameter of from about 5 to about 150 nanometers as measured by the Nicomp particle sizer.

EXAMPLE II

Preparation of a Wax Dispersion With a Volume Median Diameter of 424 Nanometers, and Stabilized with a Polyester Resin 2,882 Grams of deionized water, 158.33 grams of the 12 percent sulfonated polyester dispersion resin solution of Example I containing about 19 grams of sulfonated polyester resin, and adding thereto about 760 grams of POLY-WAX® 725 polyethylene wax (Baker Petrolite, USA) having an onset and peak melting point of about 80° C. and about 103° C., respectively, were introduced into a 1 gallon reactor. The reactor feed port was closed and the reactor agitator was set to operate at about 400 revolutions per minute. The wax mixture was heated by means of steam heating in the reactor jacket to a set temperature of about 132° C. to melt the wax. When the set temperature had been reached, the discharge valve to the Gaulin 15MR homogenizer (APV Homogenizer Group, USA) was opened and the homogenizer was turned on to pump the wax mixture through the homogenizer. Initially, the homogenizer primary valve was kept open and the secondary valve was partially closed to generate a pressure drop of about 7 megapascals through the valve as read from a pressure gauge mounted on the homogenizer in order to pre-emulsify the wax mixture for about 30 minutes. Then the homogenizer primary valve was partially closed to generate a pressure drop of about 55 megapascals through the valve in order to emulsify the pre-emulsified wax mixture for about 60 minutes. During pre-emulsification and emulsification, the wax mixture temperature as measured in the reactor with a thermocouple was maintained at about 132° C. At the completion of emulsification, the homogenizer primary and secondary valves were opened, the homogenizer was turned off, the emulsified product in the reactor was cooled by means of water in the reactor jacket to a safe temperature of less than about 40° C., discharged from the reactor into a product container and filtered through a 5 micron pore size polypropylene filter bag.

There resulted a stabilized wax dispersion comprising about 76.2 weight percent of the above sulfonated polyester resin and about 23.8 percent by weight of the above polyethylene wax as measured gravimetrically utilizing a hot plate where the ratio of the resin to wax was about 2.5 parts per hundred as determined by liquid chromatography, capillary electrophoresis and gas chromatography. The wax particles of the dispersion possessed a volume median diameter of about 424 nanometers and volume 90th percentile diameter of about 751 nanometers as determined by a Microtrac UPA150 particle size analyzer. The aforementioned product dispersion was stable, that is the wax did not settle from the dispersion and there was an absence of settled wax after six months of storage.

EXAMPLE III

Preparation of a Wax Dispersion with a Volume Median Diameter of 279 Nanometers, and Stabilized with a Polyester Resin 2,716.25 Grams of deionized water, 318.75 grams of sulfonated polyester dispersion resin solution of Example I containing about 38.25 grams of the sulfonated polyester resin, and having added thereto 765 grams of LICOWAX S™ montan wax (Baker Clariant, USA) having an onset and peak melting point of about 66° C. and about 82° C., respectively, were incorporated into a 1 gallon reactor. The reactor feed port was closed and the reactor agitator was operated at about 400 revolutions per minute. The wax mixture was heated by means of steam heating in the reactor jacket to a set temperature of about 108° C. in order to melt the wax. When the set temperature had been reached, the discharge valve to the Gaulin 15MR homogenizer (APV Homogenizer Group, USA) was opened and the homogenizer was turned on to pump the wax mixture through the homogenizer. Initially, the homogenizer primary valve was kept open and the secondary valve was partially closed to generate a pressure drop of about 7 megapascals through the valve as read from a pressure gauge mounted on the homogenizer in order to pre-emulsify the wax mixture for about 30 minutes. Then the homogenizer primary valve was partially closed to generate a pressure drop of about 55 megapascals through the valve in order to emulsify the pre-emulsified wax mixture for about 60 minutes. During pre-emulsification and emulsification, the wax mixture temperature as measured in the reactor with a thermocouple was maintained at about 108° C. After completion of the emulsification, the homogenizer primary and secondary valves were opened, the homogenizer was turned off, the emulsified product in the reactor was cooled by means of water cooling in the reactor jacket to a temperature of about 35° C., discharged from the reactor into a product container and filtered through a 5 micron pore size polypropylene filter bag.

There resulted a stabilized wax dispersion comprising about 80.75 weight percent of the above sulfonated polyester resin and about 19.25 percent by weight of the above montan wax; as measured gravimetrically utilizing a hot plate, the ratio of resin to wax is about 5 parts per hundred as determined by liquid chromatography, capillary electrophoresis and gas chromatography. The wax particles of the dispersion have a volume median diameter of about 279 nanometers and a volume 90th percentile diameter of about 368 nanometers as determined by a Microtrac UPA150 particle size analyzer. The aforementioned product dispersion was stable, that is the wax did not settle from the dispersion and there was an absence of settled wax, after seven months of storage.

EXAMPLE IV

Preparation of a Wax Dispersion with a Volume Median Diameter of 271 Nanometers, and Stabilized with a Polyester Resin 2,723 Grams of deionized water, 316.67 grams of the sulfonated polyester dispersion resin solution of Example I containing about 38 grams of sulfonated polyester resin, and to which were added 760 grams of RC-160™ carnauba wax (Toa Kasei, Japan) having an onset and peak melting point of about 69° C. and about 84° C., respectively, were placed into a 1 gallon reactor. The reactor feed port is closed and the reactor agitator was operated at about 400 revolutions per minute. The wax mixture was heated by means of steam heating in the reactor jacket to a set temperature of about 110° C. to melt the wax. When the set temperature was reached, the discharge valve to the Gaulin 15MR homogenizer (APV Homogenizer Group, USA) was opened and the homogenizer was turned on to pump the wax mixture through the homogenizer. Initially, the homogenizer primary valve was kept open, and the secondary valve was partially closed (partially closed so that the pressure drops to 7 megapascals; depends on gap generated on valve and varies depending on type of valve used) to generate a pressure drop of about 7 megapascals through the valve as read from a pressure gauge mounted on the homogenizer in order to pre-emulsify the wax mixture for about 30 minutes. Then the homogenizer primary valve was partially closed to generate a pressure drop of about 55 megapascals through the valve in order to emulsify the pre-emulsified wax mixture for about 60 minutes. During pre-emulsification and emulsification, the wax mixture temperature as measured in the reactor with a thermocouple was maintained at about 110° C. At the completion of emulsification, the homogenizer primary and secondary valves were opened, the homogenizer was turned off, the emulsified product in the reactor was cooled by means of water cooling in the reactor jacket to a temperature of less than 50° C., and more specifically, about 40° C., discharged from the reactor into a product container and filtered through a 5 micron pore size polypropylene filter bag.

There resulted a stabilized wax dispersion comprised of 81.5 weight percent of the above sulfonated polyester resin and about 19.5 percent by weight of the above carnauba wax, and as measured gravimetrically utilizing a hot plate where the ratio of the resin to wax was about 5 parts per hundred as determined by liquid chromotography, capillary electrophoresis and gas chromotography. The wax particles of the dispersion had a volume median diameter of about 271 nanometers and a volume 90th percentile diameter of about 433 nanometers as determined by a Microtrac UPA150 particle size analyzer.

The aforementioned product dispersion was stable, that is the wax did not settle from the dispersion and there was an absence of settled wax, after ten months of storage.

Other embodiments and modifications of the present invention may occur to those of ordinary skill in the art subsequent to a review of the information presented herein; these embodiments, modifications, equivalents thereof, substantial equivalents thereof, or similar equivalents thereof are also included within the scope of this invention.

What is claimed is:

1. A dispersion comprised of a wax and a hydrophilic polyester stabilizer, and wherein the volume diameter of the wax dispersion is from about 10 to about 500 nanometers.

2. A dispersion in accordance with claim 1 wherein said hydrophilic polyester is of the formula

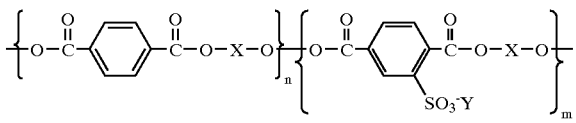

wherein Y is selected from the group consisting of hydrogen and an alkali metal, X is selected from the group consisting of an alkylene and an oxyalkylene, and n and m represent the number of segments.

3. A dispersion in accordance with claim 2 wherein the sum of n and m are from about 100 to about 10,000, and wherein n is from about 90 to about 97.5 percent of the total amount of polyester segments, and wherein m is about 2.5 to about 10 percent of the total amount of polyester segments, and wherein the total of n plus m is equal too about 100 percent.

4. A dispersion in accordance with claim 1 wherein the wax is selected from the group consisting of natural waxes, chemically modified waxes and synthetic waxes.

5. A dispersion in accordance with claim 1 wherein the wax is carnauba wax, paraffin wax, montan wax, microcrystalline polyethylene wax, polypropylene wax, polybutylene wax, polyethylene-acrylic wax, polyester wax, polyamide wax, or a Fischer-Tropsch wax.

6. A dispersion in accordance with claim 2 wherein the alkylene is a hydrocarbon of about 2 to about 36 carbon atoms.

7. A dispersion in accordance with claim 2 wherein said Y alkali is selected from the group consisting of sodium, lithium, potassium, rubidium, and cesium.

8. A dispersion comprised of a wax and a hydrophilic polyester stabilizer, and wherein the volume median diameter of the wax dispersion is from about 20 to about 400 nanometers.

9. A dispersion in accordance with claim 1 wherein the hydrophilic polyester is copoly(1,2-propylene-dipropylene-5-sulfoisophthalate)-copoly(1,2-propylene-dipropylene terephthalate), the magnesium salt of copoly(1,2-propylene-diethylene-5-sulfoisophthalate)-copoly(1,2-propylene-diethylene terephthalate), the calcium salt of copoly(1,2-propylene-dipropylene-5-sulfoisophthalate)-copoly(1,2-propylene-dipropylene terephthalate), or the barium salt of copoly(1,2-propylene-diethylene-5-sulfoisophthalate)-copoly(1,2-propylene-diethylene terephthalate).

10. A dispersion in accordance with claim 1 wherein the wax content is from about 20 to about 35 percent by weight of the dispersion, the hydrophilic polyester resin content is from 0.1 to about 5 percent by weight of the dispersion, and the remainder is water, and wherein the total of said components is about 100 percent.

11. A dispersion in accordance with claim 2 wherein said hydrophilic polyester weight average molecular weight as measured by gel permeation chromatography is from about 2,000 grams per mole to about 100,000 grams per mole; the number average molecular weight as measured by gel permeation chromatography is from about 1,000 grams per mole to about 50,000 grams per mole, and the polydispersity thereof is from about 2 to about 18, from about 2 to about 7.

12. A dispersion in accordance with claim 11 wherein said polyester weight average molecular weight is from about 4,000 to about 70,000 grams per mole, and the number average molecular weight is from about 2,000 to about 20,000 grams per mole.

13. A process for the preparation of a wax dispersion which comprises homogenizing said wax with a hydrophilic polyester stabilizer in water.

14. A process in accordance with claim 13 wherein homogenizing is accomplished at about 1,000 pounds per square inch to about 8,000 pounds per square inch for an optional duration of about 30 to about 90 minutes, and at a temperature of about 10° C. to about 25° C. above the melting point of the wax, and wherein said wax has a melting point of about 50° C. to about 120° C.

15. A process in accordance with claim 13 wherein the wax dispersion possesses a particle size diameter of about 5 to about 500 nanometers.

16. A process in accordance with claim 13 wherein the wax content is about 20 to about 35 percent by weight of the dispersion, the hydrophilic polyester resin content is from about 0.1 to about 5 percent by weight of the dispersion with the remainder of about 60 to about 65 percent by weight being water.

17. A processor in accordance with claim 13 wherein the wax is carnauba wax, paraffin wax, montan wax, microcrystalline polyethylene wax, polypropylene wax, polybutylene wax, polyethylene-acrylic wax, polyester wax, polyamide wax, or Fischer-Tropsch wax.

18. A dispersion in accordance with claim 2 wherein said alkylene is ethylene, propylene, butylene, pentylene, hexylene, heptylene, octylene, decylene, dodecylene, stearylene, octadecylene, 2-ethyl-octadecylene, and mixtures thereof.

19. A process in accordance with claim 13 wherein the hydrophilic polyester resin is of the formula

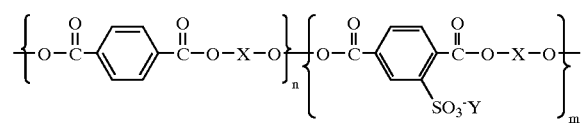

wherein Y is hydrogen or an alkali metal, X is an alkylene or oxyalkylene group, and n and m represent the number of segments.

20. A process in accordance with claim 19 wherein Y is sodium and X is alkylene.

21. A process in accordance with claim 19 wherein Y is sodium and X is 1,2-propylene.

22. A process in accordance with claim 19 wherein X is alkylene.

23. A process in accordance with claim 19 wherein Y is alkali metal.

24. A dispersion in accordance to claim 1 wherein the wax content is from about 20 to about 35 percent by weight of the dispersion, the hydrophilic polyester resin content is from about 0.1 to about 5 percent by weight of the dispersion and the remainder of about 60 to about 65 weight percent is water.

25. A dispersion in accordance with claim 24 wherein said wax remains dispersed and wherein there is minimum or no settling of said wax.

26. A dispersion in accordance with claim 2 wherein the oxyalkylene is a hydrocarbon selected from the group comprising of ethyleneoxyethylene, propyleneoxy-propylene, butyteneoxybutylene, isopropyleneoxy-isopropylene, and isobutyleneoxy-isobutylene.

27. A dispersion in accordance with claim 2 wherein Y is an alkali metal.

28. A dispersion in accordance with claim 2 wherein Y is sodium.

29. A dispersion in accordance with claim 2 wherein X is an alkylene.

30. A dispersion in accordance with claim 2 wherein Y is sodium and X is 1,2 -propylene.

31. A dispersion in accordance with claim 1 wherein said polyester is the sulfonated polyester resin sodio salt of (1,2-propylene-dipropylene-5-sulfoisophthalate)-copoly(1, 2-propylene dipropylene terephthalate).

* * * * *